Dec. 13, 1960    L. L. HOLZENTHAL    2,964,180
COTTONSEED CLEANER

Filed Feb. 11, 1959    3 Sheets-Sheet 1

INVENTOR
LEO L. HOLZENTHAL

BY *J. A. Seguin*
ATTORNEY

Dec. 13, 1960     L. L. HOLZENTHAL     2,964,180
COTTONSEED CLEANER

Filed Feb. 11, 1959     3 Sheets-Sheet 3

INVENTOR
LEO L. HOLZENTHAL

BY     ATTORNEY

United States Patent Office 2,964,180
Patented Dec. 13, 1960

2,964,180
COTTONSEED CLEANER

Leo L. Holzenthal, New Orleans, La., assignor to the United States of America as represented by the Secretary of Agriculture Filed Feb. 11, 1959, Ser. No. 792,682

2 Claims. (Cl. 209—78)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a cleaner, especially designed for the separation of foreign matter particles from cottonseed.

The cleaner of cottonseed is difficult. The seeds are unique particles of relatively low specific gravity which are usually covered with varying amounts of short cotton fibers, or linters. The seeds tend to clump together and to become entangled with almost any foreign matter particles with which they come in contact. The problem of cleaning cottonseed has become even more acute in recent years because of the increased amount of foreign matter introduced into the seeds due to rough hand picking, snapping, mechanical methods of picking, stripping, sledding and the like. In spite of improvements in the methods and apparatus for cleaning the seed at the cotton gins and cottonseed oil mills, a substantial proportion of foreign materials such as sand, dirt, small field trash, and fragments of the cotton plant (particularly the empty cotton boll and portions of its stem) remain in the seed. These types of foreign materiasl (particularly the fragments of the stems of the cotton boll or "sticks," the outer boll wall or "burr," the inner boll wall or "shale," and the junction of boll bases and stems, called "boll bases") become comminuted by the saws of linter-removing machines and remain in the linters as contaminants. These contaminants interfere with the subsequent use of the linters in chemical processes which utilize the major portion of the linters produced in this country.

The cleaner of the present invention removes substantially all the foreign matter particles which are usually present in the cottonseed as it is produced by the ginning operation. It can be used advantageously in conjunction with substantially all of the existing mill equipment such as delintering equipment, conveying equipment, cleaning, hulling and meats purification equipment, and the like equipment with which cottonseed is conventionally handled and processed.

Substantially any cottonseed can be suitably cleaned. Illustrative examples of suitable cottonseeds include the undelintered cottonseed as it is discharged from the cotton gin, undelintered cottonseed as it is discharged from the conventional cottonseed cleaning machines, partially delintered cottonseed as it is discharged from the delintering machines, and the like. Where undelintered cottonseed as it is usually received at the cottonseed oil mill is employed, the cottonseed is preferably first freed of the easily removable contaminants, such as large field trash, metal, unattached lint and/or linters, grabbots, and the like, by means of the conventional processes such as screening with shaker screens and the like. However, if desired the cleaner can be used directly to clean unusually dirty seed by an initial cleaning of the seed followed by recycling the partially cleaned seed to the cleaner for additional cleaning.

In general, according to the invention, the cleaner is provided with an inclined moving belt onto the upper portion of which the seed contaminated with foreign-matter particles is fed, the movement of the belt being such that the seeds travel downwardly by gravity along the incline and fall off the belt while the contaminating particles are trapped on the surface of the belt and are conveyed along with it to their point of discharge. The particular feature of novelty relates to the belt which is constructed with a resilient surface and numerous spaced protuberances, the spacing and arrangement being such that the seeds will not be trapped between the protuberances, but the contaminating particles will be. The resilient surface provides for a rebound or bouncing action of the seeds as they travel downwardly along the belt with the result that the contaminating particles tend to be loosened from the seeds and the seeds from each other, thus providing for a more efficient separation.

The protuberances are arranged in parallel rows staggered such that both horizontally extending and diagonal channels are present on the working surface.

For a detail description of the invention, reference is made to the accompanying drawing in which.

Figure 4:
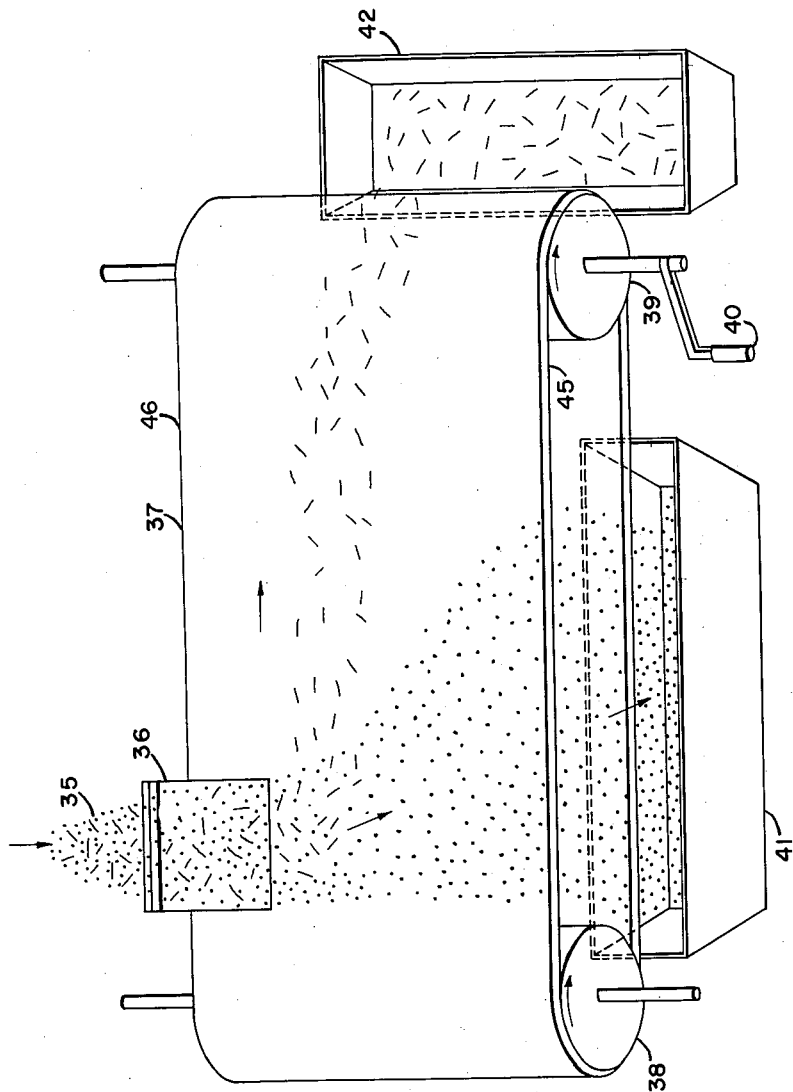
Figure 5:
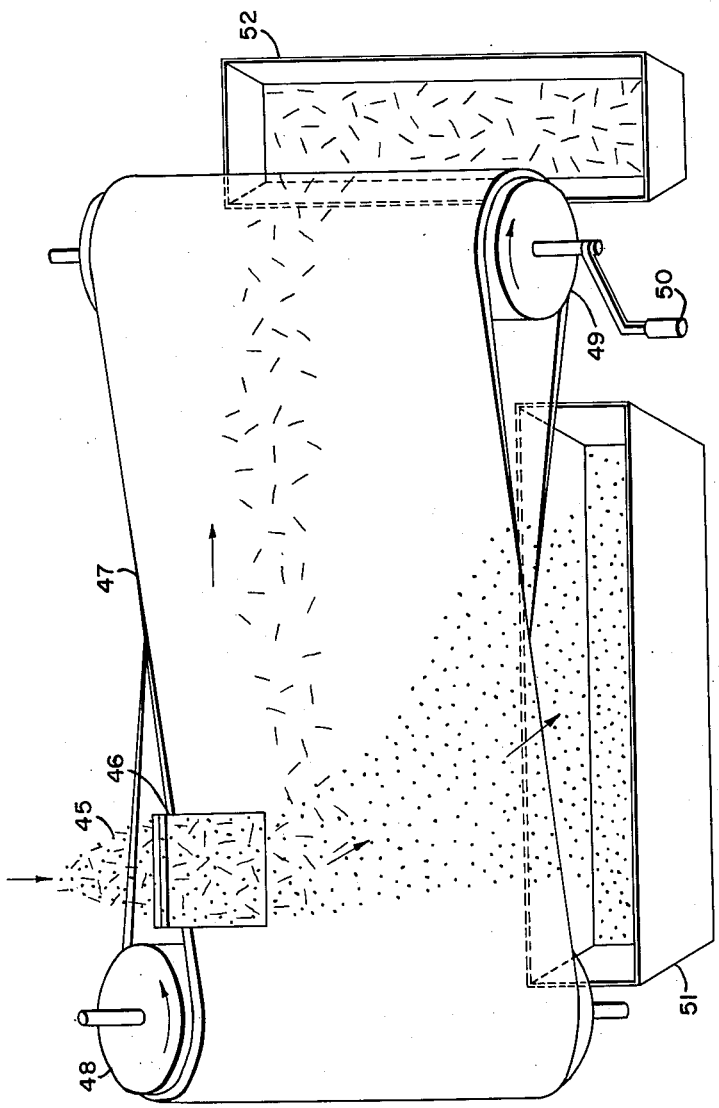

Fig. 4 is a three dimensional view schematically showing a second embodiment of the cleaner in which the plane of the belt is inclined to the horizontal such that both the upper and lower edges of the belt are parallel to each other and parallel to the horizontal, the belt presenting a flat separation surface, the direction of belt movement being at essentially right angles to the flow of seed; and Fig. 5 is a three dimensional view schematically showing a third embodiment of the cleaner in which the axes of the belt pulleys are not parallel, the axis of the pulley nearest the feed end of the belt being inclined further away from horizontal than the axis of the other pulley, the belt thus presenting a skewed separation surface moving at essentially right angles to the flow of seed.

The cleaner accepts a disentangled or "opened" stream of cottonseed 10 which is dropped first upon a baffle-board 11 provided with a resilient surface 12 from where it rebounds or bounces onto the endless belt 13. Belt 13 is carried on a lower idler pulley 14 and upper driven pulley 15 which is driven by any conventional means, 16 illustrating a hand crank for the purpose. Seeds striking the belt 13 rebound and roll down the belt in a direction countercurrent to the direction of belt travel and are collected in seed container 18. The contaminating particles are trapped on the belt surface and carried over into trash container 19.

If the feeding device employed tends to deliver the seed in periodic increments, rather than continuously, such that sympathetic vibration may be set up in the traveling belt, the use of baffleboard 11 is desirable. If the feed is abrasive in character and will unduly damage and wear the traveling belt, the baffleboard should be employed. The baffleboard is preferably covered with an abrasion-resistant resilient material and mounted in a plane substantially parallel to the plane of the traveling belt such that the rebounding seed fall onto the belt in the manner indicated in the drawing.

Figure 2:
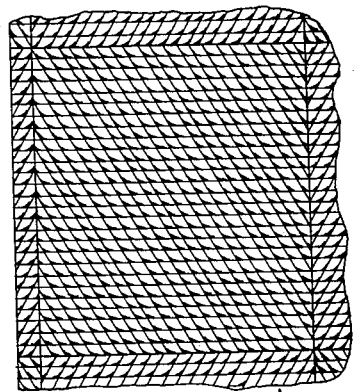
Fig. 2 is a view showing a portion of the surface of the belt.
Figure 3:
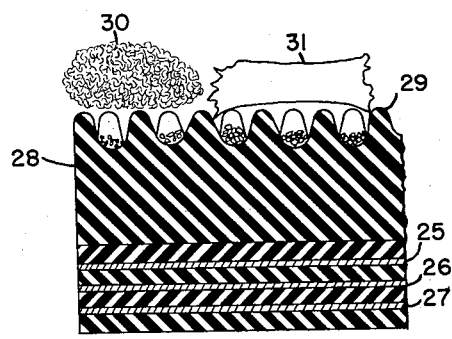
Fig. 3 is an enlarge section on line 3—3 of Fig. 2.

The structure of the belt is illustrated in Figs. 2 and 3. Re-enforcing plies 25, 26, and 27 are embedded in rubber. The working surface layer 28 also of resilient rubber is covered with numerous finger-like protuberances 29. A cottonseed 30 is depicted laying atop the protuberances, and a stick 31 is shown with its ends wedged between protuberances such that it is trapped on the surface of the belt.

The thickness of layer 28 must be such that, in conjunction with the remaining portion of the belt, sympathetic vibrations are not set up in the belt when it is traveling. A thickness of about 5/16 inch is usually preferred for layer 28. The finger-like protuberances 29 are preferably arranged in parallel rows staggered such that both horizontally extending and diagonal channels are present on the surface layer, as illustrated in Fig. 2. Such structure avoids through channels from top to bottom with the result that the particles of foreign matter are more effectively deaccelerated and entrapped on the surface of the belt.

For cleaning cottonseed, it is preferred that the protuberances be about 1/8 inch in length (depth), the top surface of each protuberance being elongated and of about 1/16 x 1/8 inch dimension, the top surfaces being inclined at about a 45° angle from the horizontal and being spaced about 1/8 inch apart, center to center. A discontinuous pattern as illustrated in Fig. 2 is preferred, and this is preferably achieved by changing the direction of inclination of the top surfaces of the protuberances from right to left in alternate squares or blocks of about 3 inch x 3 inch dimension. Although this type of construction of belt is the preferred one for cleaning cottonseed, the size and spacing of the protuberances may be varied considerably as long as the channels are of proper size to allow foreign matter to be trapped while permitting the seed to ride atop the protuberances. That is to say, the effective spacing of the protuberances must be less than the smaller diameter of the seed being cleaned.

As mentioned earlier, the rebound feature inherent in a resilient belt surface is essential. Because the individual cottonseeds have a more or less uniform ellipsoidal shape, the rebound tendency of each seed will be quite similar regardless of the position of the seed when it strikes the inclined resilient belt surface. That is to say, cottonseed will always rebound at least once and in most cases will rebound a multiple number of times such that they are accelerated and bounce off or roll off of the traveling belt. A less uniform object—for example, a cotton boll stem, which is elongated and innately curved—will not rebound or roll as readily as the seed and will consequently be deaccelerated and held on the belt surface for separation as foreign matter from the seed.

For cleaning cottonseed it is preferred that the resilience of the layer 28 of the belt be such that compressometer readings are approximately as follows:

| Pressure applied to layer, lbs. per sq. in.: | Depression inches |
| --- | --- |
| 0.10 | 0.042 |
| 0.50 | 0.051 |
| 1.00 | 0.054 |
| 2.00 | 0.065 |

Figure 1:
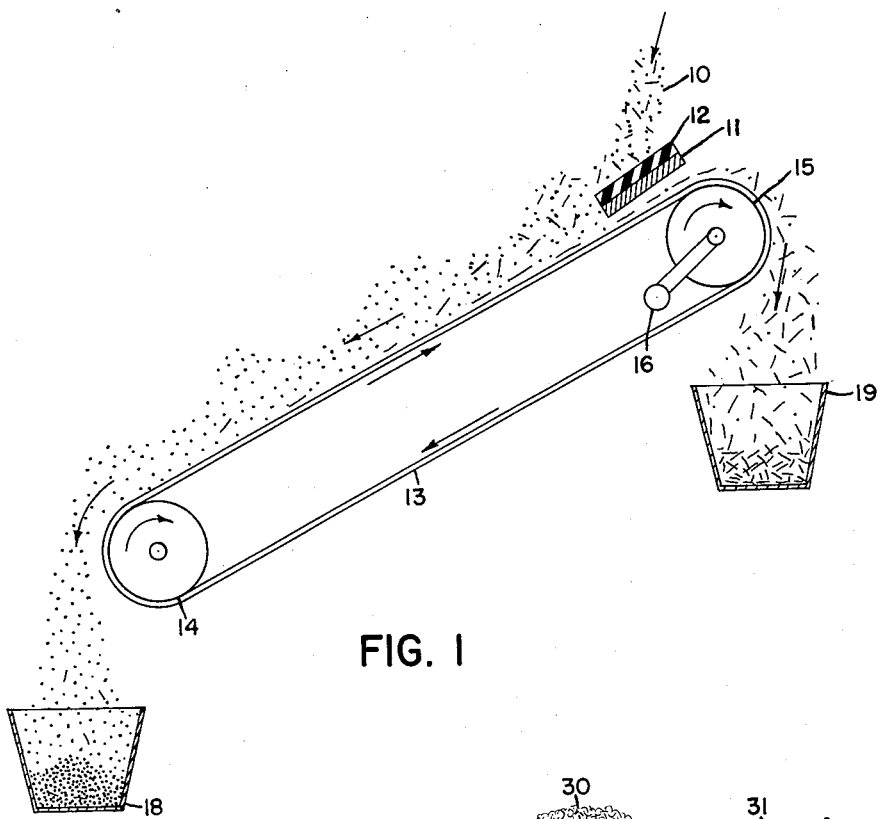
Fig. 1 is a side elevation schematically showing one embodiment of the cleaner, the inclined belt traveling upward in the direction of the incline, the belt presenting a flat separation surface, the direction of belt movement being countercurrent to the flow of seed.

In the embodiment shown in Fig. 4 the stream of cottonseed 35, baffleboard 36, endless belt 37, idler pulley 38, driven pulley 39, hand crank 40, seed container 41 and trash container 42 compare generally to the correspondingly named parts of the embodiment of Fig. 1. Pullies 38 and 39 are, however, set side by side so that the endless belt travels laterally as viewed in Fig. 4. The axes of the pulleys are inclined so that the lower edge 45 of the belt and the upper edge 46 are parallel. In this instance the cleaned seed falls off the lower edge while the foreign matter particles move laterally with the belt and fall off the end into container 42.

In the embodiment shown in Fig. 5 the stream of cottonseed 45, baffleboard 46, endless belt 47, idler pulley 48, driven pulley 49, hand crank 50, seed container 51, and trash container 52 compare generally to the correspondingly named parts of the embodiment of Fig. 4. The axes of pulleys 48 and 49 are, however, not parallel, the axis of pulley 48 being inclined while that of pulley 49 is substantially horizontal.

The operating position of the traveling belt as regards its angle of inclination and its relation to the feed source, the direction and speed of belt travel, the length and width of the belt, the feed rate, and the use of multiple cleaning units are all a matter of choice. For cleaning most types of cottonseed, the embodiment shown in Fig. 4 with the belt traveling at essentially right angles to the direction of the feed and with the plane of the belt inclined from about 25° to about 40° from the horizontal is preferred. For cleaning cottonseed containing extremely short cylindrical stems, the embodiment shown in Fig. 5 is advantageous.

Preferred belt speeds range from about 50–300 ft. per minute and feed rate up to about 15 lbs. of cottonseed per minute for an endless belt 37 inches wide and 5 ft. long, center to center of the pulleys.

The seed may be fed to the cleaner by hand or by means of any conventional feeding device which will substantially disentangle and substantially individualize the seed and impart sufficient momentum to the seed so that they will rebound from the resilient belt surface.

I claim:

1. A cottonseed cleaner comprising an endless, inclined moving belt having a resilient working surface provided with flexible protuberances spaced closer together than the effective diameter of the seeds to be cleaned and being arranged in parallel rows staggered such that both horizontal extending and diagonal channels are present on the working surface, and means for feeding cottonseed containing contaminating particles onto the resilient working surface at the upper portion of the inclined belt, the seeds traveling downwardly by gravity along the belt towards the lower portion of the belt with a bouncing action thus to loosen the contaminating particles from the seeds and the seeds from each other, the contaminating particles being trapped by the protuberances and carried along with the belt, whereby they are separated from the seeds.

2. A cottonseed cleaner comprising an endless moving belt inclined about from 25° to 40° from the horizontal, the working surface of the belt being resilient and provided with flexible protuberances arranged in parallel rows and staggered such that both horizontally extending and diagonal channels are present on the working surface, the spacing of the protuberances being about 1/8 inch, the belt being so constructed that sympathetic vibrations are not set up in the belt when it is traveling, the working surface of the belt being of such resilience that pressures of 0.1 pound per square inch and 2 pounds per square inch applied to said belt surface will cause depressions of about 0.042 inch and 0.065 inch, respectively, and means for feeding cottonseed containing contaminating particles onto the resilient working surface at the upper portion of the inclined belt, the seeds traveling downwardly by gravity along the belt towards the lower portion of the belt with a bouncing action thus to loosen the contaminating particles from the seeds and the seeds from each other, the contaminating particles being trapped by the protuberances and carried along with the belt, whereby they are separated from the seeds.

References Cited in the file of this patent

UNITED STATES PATENTS

| 1,744,967 | Johnson | Jan. 28, 1930 |
| 2,295,432 | Smith | Sept. 8, 1942 |
| 2,712,162 | Young | July 5, 1955 |
| 2,732,867 | May et al. | Jan. 31, 1956 |

FOREIGN PATENTS

| 332,927 | Great Britain | July 30, 1930 |
| 934,843 | France | June 2, 1948 |